(12) United States Patent
Truong

(10) Patent No.: US 6,940,517 B1
(45) Date of Patent: Sep. 6, 2005

(54) APPARATUS AND METHOD FOR PIXEL CONVERSION USING MULTIPLE BUFFERS

(75) Inventor: Pat Truong, Mississauga (CA)

(73) Assignee: ATI Technologies Inc., Markham (CA)

( * ) Notice: Subject to any disclaimer, the term of this patent is extended or adjusted under 35 U.S.C. 154(b) by 0 days.

(21) Appl. No.: 10/831,788

(22) Filed: Apr. 26, 2004

(51) Int. Cl.[7] .............................................. G09G 5/36
(52) U.S. Cl. ...................... 345/545; 345/426; 345/582; 345/600
(58) Field of Search ............................... 345/501, 506, 345/530, 531, 545, 536, 426, 582, 600, 589, 345/591, 592, 603–605

(56) References Cited

U.S. PATENT DOCUMENTS

| | | | |
|---|---|---|---|
| 5,808,629 A | * | 9/1998 | Nally et al. .................. 345/539 |
| 6,411,302 B1 | * | 6/2002 | Chiraz ........................ 345/545 |
| 6,664,963 B1 | * | 12/2003 | Zatz ........................... 345/426 |
| 6,738,072 B1 | * | 5/2004 | MacInnis et al. ........... 345/501 |

* cited by examiner

Primary Examiner—Kee M. Tung
(74) Attorney, Agent, or Firm—Vedder, Price, Kaufman and Kammholz

(57) ABSTRACT

A method and apparatus for pixel conversion using multiple buffers includes receiving a position value including a horizontal value and a vertical value. The method and apparatus further includes receiving a byte per pixel value and a pixels per group. The method and apparatus further includes determining a pitch value for each of the multiple buffers and determining an offset value for each of the multiple buffers. The method and apparatus further includes assigning each of the multiple buffers to varying buffer locations within a frame buffer based on the position value, the byte per pixel value and the pixels per group value such that a first and second converted pixel values may be equivalent to a first and second corresponding assigned buffer location.

21 Claims, 3 Drawing Sheets

APPARATUS AND METHOD FOR PIXEL CONVERSION USING MULTIPLE BUFFERS

FIELD OF THE INVENTION

The present invention relates generally to image rendering and more specifically to parallel data processing of pixel conversion data.

BACKGROUND OF THE INVENTION

In current pixel rendering systems, textile fetches may be performed for multiple elements of a single pixel, such as Y, U and V. The shader operations may be performed on multiple pixel elements in parallel. Although these systems limit the output of converted pixels in ARGB format directly to multi-buffers, but prevent simultaneous transfers from various multi-buffers to a frame buffer.

Due to the limitation of not being able to export more than one pixel elements across four separate channels, such as an A channel, R channel, G channel and B channel of an ARGB formatted pixel, to the same memory, current processing approaches provide for the pixel shader to export one pixel to the render backend at a time. For example, converting YUY2 formatted pixels to ARGB32 formatted pixels provides for the conversion from four bytes in the YUY2 format to produce two pixels of ARGB32 format. Because of the limitations, fetching four bytes of YUY2 pixel data and processing the pixel data, outputting two pixels of ARGB32 cannot be achieved. One current solution is to process one YUY2 pixel twice, each process outputs a single ARGB32 pixel. Moreover, two texture fetches maybe performed for each ARGB32 output. In one embodiment, one fetch is two bytes, which can contain one Y component, and the other fetch is four bytes, which contains one byte of U component and byte of V component. Thereupon, the shader can process and output one pixel in ARGB32 format.

In this embodiment, for the second pixel of ARGB32 format, the same YUY2 would fetch the next two bytes of YUY2 containing the second Y component and fetch the same four bytes containing the same U and V components from the first process. Thereupon, the current approach not only requires extraneous fetches but also limits available processing speeds due to prohibitions of simultaneous pixel transfers from multi-buffers to a corresponding frame buffer.

Therefore, there exists a need for a system allowing for pixel conversion with multi-buffers and the parallel data transfer of multiple converted pixels to a corresponding frame buffer or another suitable memory structure.

DETAILED DESCRIPTION OF THE PREFERRED EMBODIMENTS

Briefly, the present invention includes a method and apparatus for pixel conversion using multiple buffers including receiving a position value that includes a horizontal value and a vertical value. In one embodiment, position value maybe a coordinate value, wherein the horizontal value indicates an X location of the coordinate and the vertical value indicates a Y value of the coordinate. The method and apparatus further includes receiving a byte per pixel value and pixels per group value. The byte per pixel value indicates the number of bytes included per each pixel value and the pixels per group value is a value indicating the number of pixels contained within a particular group, wherein a group is defined as the number of multibuffers which are being utilized to hold pixel information.

The method and apparatus further includes determining a pitch value for each of the multiple buffers, wherein a pitch value indicates the number of pixels needed to increment for the next visible viewing line, for example, one embodiment a horizontal pitch value may indicate the number of pixels in a horizontal viewing line and a vertical pitch value may indicate the number of pixels in a vertical line of a display. The method and apparatus further includes determining an offset value for each of the multiple buffers, wherein an offset value indicates an offset amount indicative of the number of bytes within a particular multiple buffer.

The method and apparatus for pixel conversion further includes assigning each of the multiple buffers to varying buffer locations within a frame buffer based on the position value, the byte per pixel value and the pixels per group value. Thereupon, once each of the multiple buffers is assigned a different buffer location, the method and apparatus for pixel conversion using multiple buffers allows for the parallel data transfer of converted pixel information from the multiple buffers to the frame buffer without overriding existing pixel information.

Figure 1:
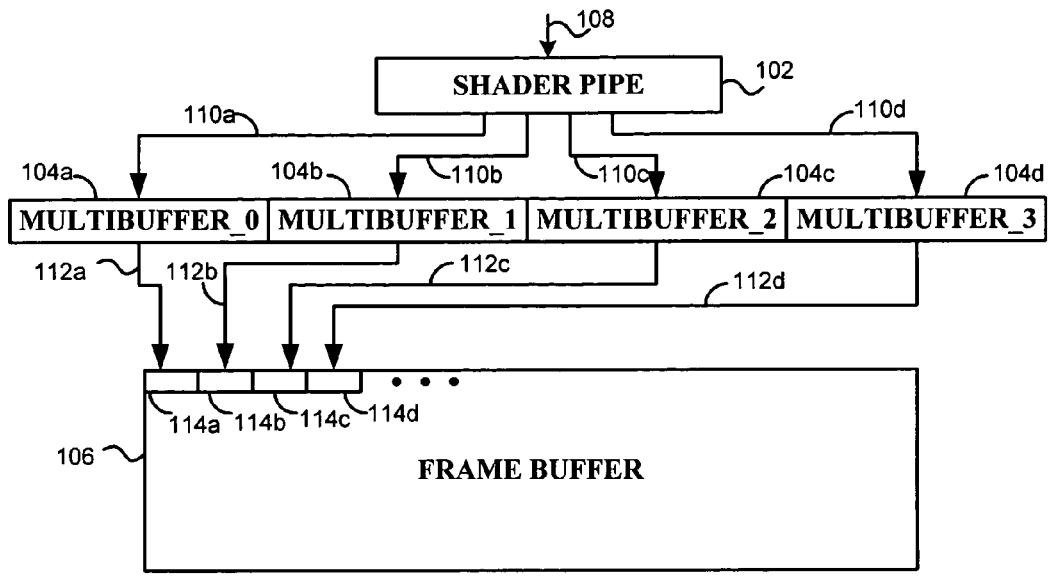
FIG. 1 illustrates a schematic block diagram of an apparatus for pixel conversion using multiple buffers in accordance with one embodiment of the present invention.

More specifically, FIG. 1 illustrates a portion of a pixel processing system included a shader pipe 102 coupled to multiple multibuffers 104A–104D and the multibuffers 104 coupled to a frame buffer 106. In one embodiment, the shader pipe receives unconverted pixel information 108 and thereupon generates pixel information 110A–110D whereupon, the multibuffers 104A–104D provide stored pixel information 112A–112D to frame buffer locations 114A–114D within the frame buffer 106. It is also noted, the pixel information 112A–112D may be designated as separate channels, as discussed above for an A channel, R channel, G channel and B channel.

The present invention includes the assignment of the various multibuffers 104 to corresponding memory locations 114 within the frame buffer 106. In the embodiment illustrated in FIG. 1, four multibuffers 104A–104D are illustrated corresponding to four frame buffer memory locations 114A–114D. As recognized by one having ordinary skill in the art, any suitable number of multibuffers 104 maybe utilized and thereupon corresponding number of memory locations 114 maybe assigned within the frame buffer. It should also be noted that FIG. 1 illustrates a direct corresponding relationship in sequential ordering from multibuffers 104 to memory locations 114, whereas in another embodiment any suitable variance of locations of memory locations 114 from the frame buffer maybe associated with multibuffer 104 location, for example when pixel information maybe swizzled or any other processing technique to adjust or re-arrange pixel information.

The shader pipe 102 of FIG. 1 utilizes new programming techniques to assign the multibuffers 104 to corresponding frame buffer 106 memory locations 114. As noted by one having ordinary skill in the art, the techniques for aligning multibuffer 104 locations with memory locations 114 maybe performed by the shader pipe 102, but may also be performed by any other suitable processing component, such as but not limited to a stand alone processing element, a combination of processing elements within a pixel processing pipeline or any other suitably designated processing location.

In one embodiment, the processing element 102 may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium.

Figure 2:
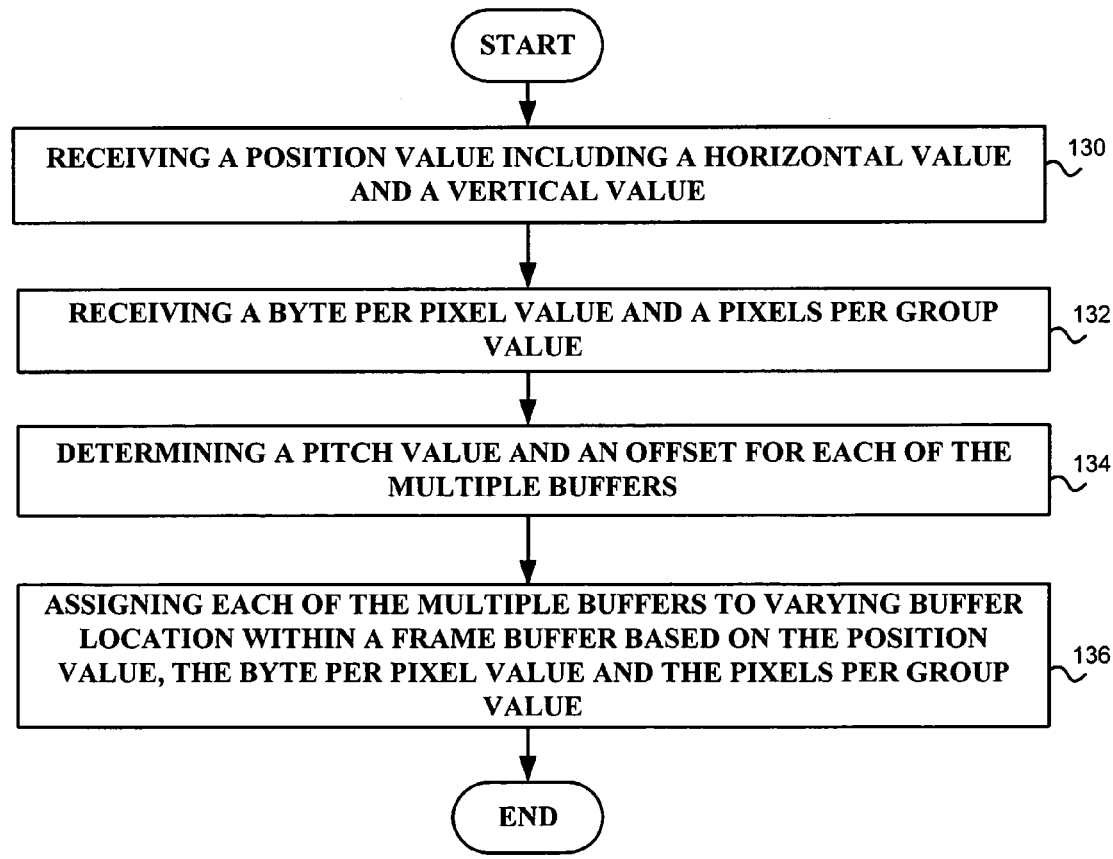
FIG. 2 illustrates a flowchart of a method for pixel conversion using multiple buffers in accordance with one embodiment of the present invention.

In one embodiment, the present invention utilizes the steps of FIG. 2 for pixel conversion using multiple buffers. The first step 130 is receiving a position value including a horizontal value and vertical value. As noted above, the position value maybe a general coordinate value including X, Y coordinates, the horizontal value indicating an X position of the coordinate and a vertical value indicating a Y position of a coordinate. Step 132 is receiving a byte per pixel value and a pixel per group value. Step 134 is determining a pitch value and offset value for each of the multiple buffers. Thereupon, step 136 is assigning each of the multiple buffers, such as multiple buffers as 104 of FIG. 1, to varying buffer locations within a frame buffer based on the position value, the byte per pixel value and the pixels per group value. As discussed below with respect FIG. 3, the above noted method maybe performed within a pixel processing pipeline to allow for the assignment of multiple buffers 104 of FIG. 1 to buffer locations 114 of FIG. 1. In this embodiment, the method is complete.

Figure 3:
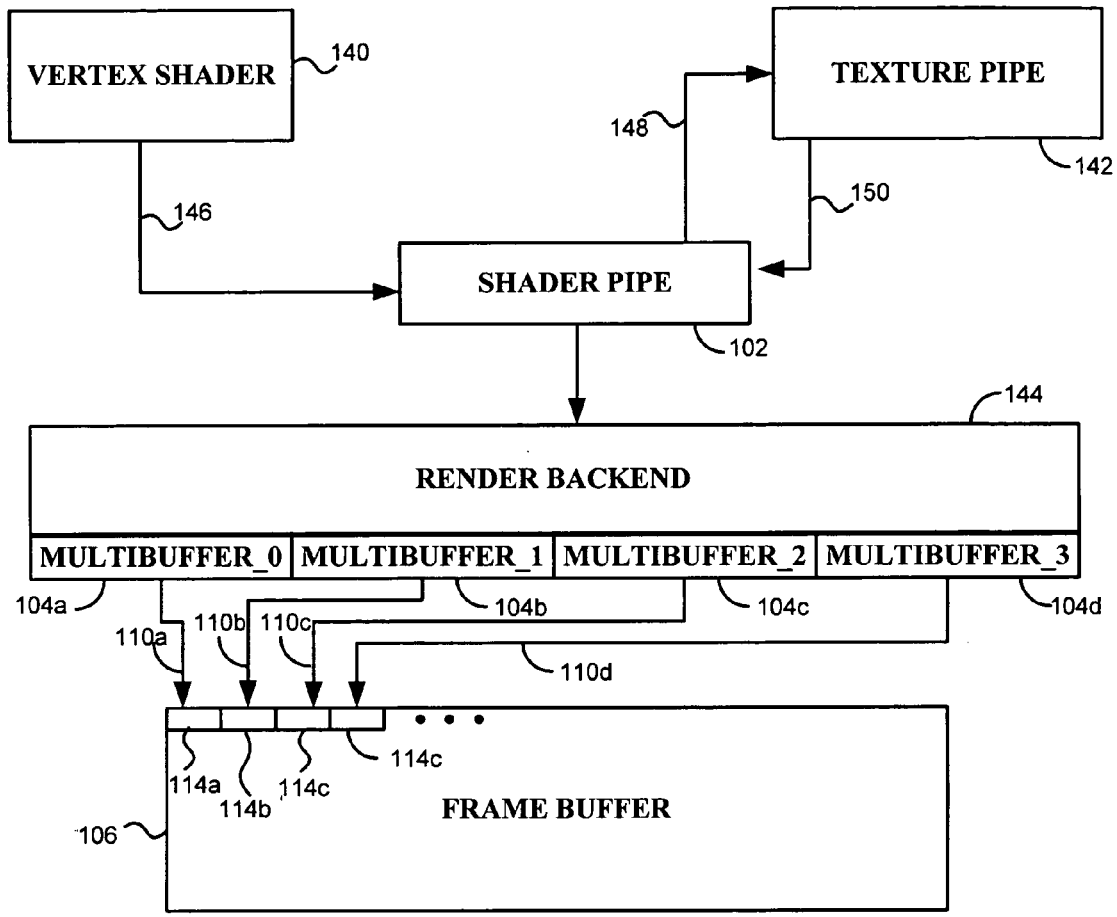
FIG. 3 illustrates schematic block diagram of another embodiment of an apparatus for pixel conversion using multiple buffers.

FIG. 3 illustrates another embodiment of the present invention including the shader pipe 102 further coupled to a vertex shader 140 and a texture pipe 142. The shader pipe 102 is further coupled to a render backend 144 including the multibuffers 104A–104D. Similar to the embodiment as described above with respect to FIG. 1, the multibuffers 104 provide pixel information 10 to assigned memory locations 114A–114D within the frame buffer 106.

Below described herein is one exemplary embodiment of the present invention. As recognized by one having ordinary skill in the art, the below-described embodiment is for exemplary purposes only and not meant to be so limiting herein.

Figure 4:
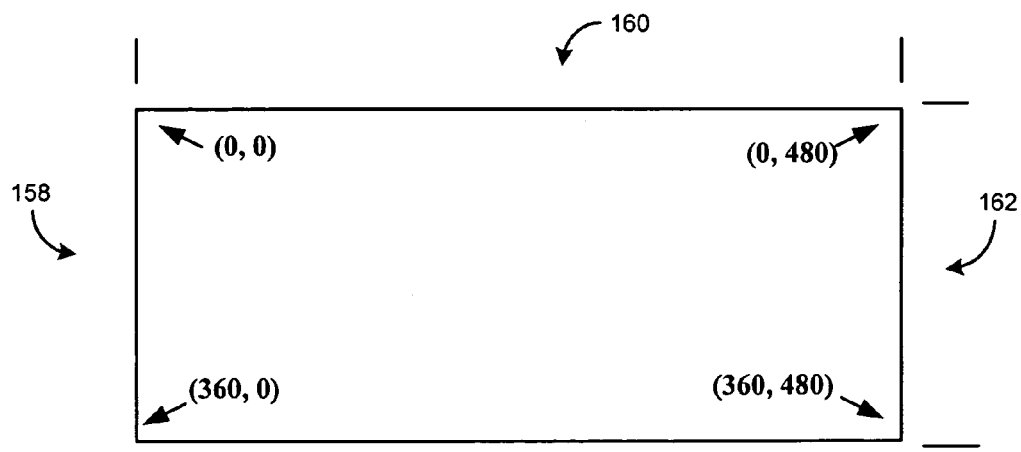
FIG. 4 illustrates a graphical representation of a display corresponding to subsequent converted pixel data from the frame buffer.

FIG. 4 illustrates a graphical representation of a display area having 480 horizontal pixel locations 160 and 360 vertical pixel locations 162. Wherein, a position value as described above may include the coordinate locations illustrated within the display 158 of FIG. 1.

Figure 5:
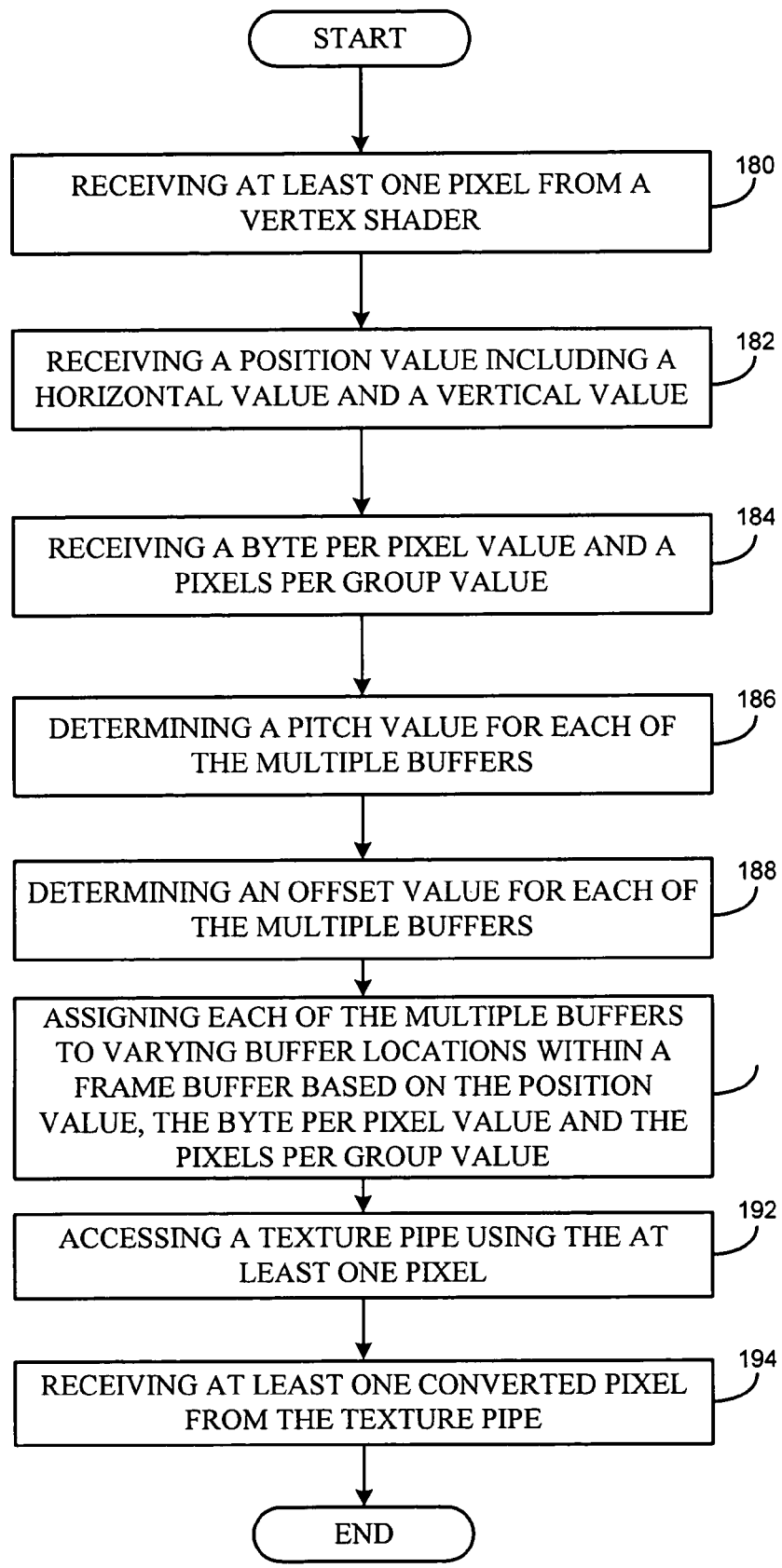
FIG. 5 illustrates another flowchart of a method for pixel conversion using multiple buffers in accordance with another embodiment of the present invention.

FIG. 5 illustrates steps of one embodiment of a method for pixel conversion using multiple buffers, as described with reference to FIG. 3. The first step is receiving at least one pixel vertex shader, step 180. The vertex shader 140 of FIG. 3 provides the at least one pixel 146 to the shader pipe 102. In one embodiment, the pixels are in a non-ARGB format, such as YUV based format.

The next step, step 182 is receiving a position value including a horizontal value and a vertical value. Using the exemplary display of FIG. 4, a position value may be the coordinate (0,0), with the horizontal value 0 and the vertical value 0.

Step 184 is receiving a byte per pixel and pixels per group value. In the exemplary embodiment that the pixels from the vertex shader are in YUV format, a byte per pixel value and the pixels per group value may be one as there is one pixel per group. In one embodiment, the vertex shader 140 may calculate the byte per pixel value and the pixels per group value, but the shader pipe 102 may also calculate these values based on the received at least one pixel 146 from the vertex shader 140.

Step 186 is determining a pitch value for each of the multiple buffers. A pitch value is determined based on the number of corresponding pixel locations within an output display, such as 480 for a horizontal pitch and 360 for a vertical pitch in the display 158 of FIG. 4. Step 188 is determining an offset value for each of the multiple buffers. In one embodiment, the offset value may calculated using equations 1 and 2.

$$Multibuffer\_0 = (Y*pitch\_0*byte\_per\_pixel\_0) + (((X*pixel\_in\_group) + pixel\_offset\_0) *byte\_per\_pixel\_0) \quad \text{Equation 1}$$

$$Multibuffer\_1 = (Y*pitch\_1*byte\_per\_pixel\_1) + (((X*pixel\_in\_group) + pixel\_offset\_1) *byte\_per\_pixel\_1) \quad \text{Equation 2}$$

In the above equations, Y and X represent the corresponding horizontal and vertical position values, respectively. The pitch represents the pitch value. The byte per pixel represents the byte per pixel value. The number of pixel offset represents a pixel offset value. In a typical system using a common frame buffer, the pitch values would be the same and the byte per pixel values would also be the same as each other.

As recognized by one having ordinary skill in the art, the number of pixels in a group is determined by the pixel format. For example, the YUY2 format includes two pixels in the group, the YV12 format includes four pixels in a group and the NV12 includes two pixels in a group.

The method of FIG. 5 further includes assigning each of the multiple buffers to varying buffer locations within a frame buffer based on the position value, the byte per pixel value and the pixel per group value. As noted above, in equations 1 and 2, using these values and corresponding equations for each of the various multibuffers 104A–104D, corresponding frame buffer memory locations are determined and assigned for the writing of formatted pixel data 110 thereto.

The method of FIG. 5 further includes accessing a texture pipe using the at least one pixel. In the embodiment of FIG. 3, the texture pipe 142 receives a texture request 148 and thereupon provides at least one converted pixel 150 from the texture pipe to the shader pipe 102. Thereupon, Step 194 is receiving at least one converted pixel from the texture pipe. The shader pipe 102 includes the converted pixels, which are provided to render backend such that further processing maybe performed thereon. From the render backend, the pixel information may be provided to the multibuffers and thereupon provided in parallel from the multibuffers 104 to the frame buffers 114 through the assignment of the multibuffers 104 to corresponding frame buffer memory locations 114. As such, the method of FIG. 5 is complete.

Therefore, using the above exemplary embodiment would provide for the first multibuffer, multibuffer_0, as noted in Equation 1 to be equal to zero. Multibuffer 1, multibuffer_1, would be equal to four based on Equation 2. More specifically, for Equation 1, the Y coordinate value is zero, the pitch_0 equals 480 based on FIG. 4, and the byte per pixel value is four. Further in Equation 1, the X position value is zero, the pixels in group value is two, the pixel offset value is zero and the byte per pixel is four. Therefore, multibuffer_0 equals zero. Regarding Equation 2, pitch_1 is also equal to 480, the byte per pixel_1 is equal to four and the pixel_offset_1 is equal to one. As such, multibuffer_1 is equal to four.

As such, the present invention allows for the shader pipe 102 to perform standard shader pipe operations and pixel processing in conjunction with a render backend 144. Through the use of multiple multibuffers 104, each multibuffer 104 can be assigned to a corresponding frame buffer memory location 114 within the frame buffer 106 for the parallel transfer of pixel information 112 to the frame buffer, wherein the pixel information 112 is typically in an ARGB format. In one exemplary embodiment, channel 112A may include information, channel 112B may include R information, channel 112C may include G pixel information and channel 112D may include B pixel information in the ARGB format. As such the present invention allows for improved processing through the parallel data transfer of pixel information from multiple multibuffers 104 to a signal frame buffer 106 without overriding existing information written therein the frame buffer.

It should be understood that the implementation of other variations and modifications of the invention in its various aspects will be apparent to those of ordinary skill in the art, and that the invention is not limited by the specific embodiments described herein. For example, the computations of the method illustrated in equations 1 and 2 may be computed on any available processing device and the number of computations may be performed relevant to the number of multibuffers being used to transfer multiple channels of data from multibuffers to a frame buffer. It is therefore contemplated to cover by the present invention, any and all modifications, variations or equivalents that fallen within the spirit and scope of the basic underlying principles disclosed and claimed herein.

What is claimed is:

1. A method for pixel conversion using multiple buffers comprising:
   receiving a position value including a horizontal value and a vertical value;
   receiving a byte per pixel value and a pixels per group value;
   determining a pitch value for each of the multiple buffers;
   determining an offset value for each of the multiple buffers; and
   assigning each of the multiple buffers to varying buffer locations within a frame buffer based on the position value, the byte per pixel value and the pixels per group value.

2. The method of claim 1 further comprising:
   writing a first converted pixel value to a first assigned buffer location; and
   writing a second converted pixel value to a second assigned buffer location.

3. The method of claim 1 further comprising:
   receiving at least one pixel from a vertex shader;
   accessing a texture pipe using the at least one pixel; and
   receiving at least one converted pixel from the texture pipe.

4. The method of claim 3 wherein the at least one converted pixel includes a first converted pixel and a second converted pixel, the method further comprising:
   writing a first converted pixel value to a first assigned buffer location; and
   writing a second converted pixel value to a second assigned buffer location.

5. The method of claim 3 wherein the at least one converted pixel is in an RGB format.

6. The method of claim 1 further comprising:
   determining a plurality of pixel offset values for each of the multiple buffers wherein the pixel offset values are determined for each of the multiple buffers based on the sequence of the multiple buffers.

7. The method of claim 6 wherein the step of assigning each of the multiple buffers to varying buffer locations further comprises:
   (a) multiplying the vertical value with the pitch value and the byte per pixel value;
   (b) multiplying the horizontal value with the pixels per group value;
   (c) adding the product of (b) with the pixel offset value;
   (d) multiplying the sum of (c) with the byte per pixel value; and
   (e) adding the product of (a) with the product of (d).

8. The method of claim 7 wherein steps (a) through (e) are repeated once for each of the multiple buffers.

9. An apparatus for pixel conversion using multiple buffers comprising:
   a processing device operably coupled to the multiple buffers, the processing device operative to, in response to executable instructions:
   receive a position value including a horizontal value and a vertical value;
   receive a byte per pixel value and a pixels per group value;
   determine a pitch value for each of the multiple buffers;
   determine an offset value for each of the multiple buffers; and
   assign each of the multiple buffers to varying buffer locations within a frame buffer based on the position value, the byte per pixel value and the pixels per group value;
   the multiple buffers operative to receive a plurality of formatted pixels from the processing device; and
   the frame buffer operatively coupled to the multiple buffers, wherein the multiple buffers write the formatted pixels from each of the multiple buffers to assigned memory locations within the frame buffer.

10. The apparatus of claim 9 further comprising:
    a first buffer of the multiple buffers operative to write a first converted pixel to value a first assigned buffer location; and
    a second buffer of the multiple buffers operative to write a second converted pixel value to a second assigned buffer location.

11. The apparatus of claim 9 wherein the processing device is disposed within a shader pipe, the apparatus further comprising:
    a vertex shader operably coupled to the shader pipe, the shader pipe operative to receive at least one pixel from the vertex shader.

12. The apparatus of claim 11 further comprising:
    a texture pipe operably coupled to the shader pipe, the texture pipe operative to receive the at least one pixel from the vertex shader and the shader pipe operative to receive at least one converted pixel therefrom.

13. The apparatus of claim 12 wherein the at least one converted pixel is in an RGB format.

14. The apparatus of claim 12 further comprising:
a render backend operatively coupled to the shader pipe and multiple buffers such that the render backend is operative to receive the at least one converted pixel therefrom and the multiple buffers operative to receive the formatted pixels from the render backend.

15. An apparatus for pixel conversion using multiple buffers comprising:
a shader pipe operably coupled to the multiple buffers;
a vertex shader operably coupled to the shader pipe, the shader pipe operative to receive at least one pixel from the vertex shader;
the shader pipe operative to, in response to executable instructions:
  receive a position value including a horizontal value and a vertical value;
  receive a byte per pixel value and a pixels per group value;
  determine a pitch value for each of the multiple buffers;
  determine an offset value for each of the multiple buffers; and
  assign each of the multiple buffers to varying buffer locations within a frame buffer based on the position value, the byte per pixel value and the pixels per group value;
a texture pipe operably coupled to the shader pipe, the texture pipe operative to receive the at least one pixel from the vertex shader and the shader pipe operative to receive at least one converted pixel therefrom;
the multiple buffers operative to receive a plurality of formatted pixels from the shader pipe; and
the frame buffer operatively coupled to the multiple buffers, wherein the multiple buffers write the formatted pixels from each of the multiple buffers to assigned memory locations within the frame buffer.

16. The apparatus of claim 15 further comprising:
a first buffer of the multiple buffers operative to write a first converted pixel value to a first assigned buffer location; and
a second buffer of the multiple buffers operative to write a second converted pixel value to a second assigned buffer location.

17. A method for pixel conversion using multiple buffers comprising:
receiving at least one pixel from a vertex shader;
receiving a position value including a horizontal value and a vertical value;
receiving a byte per pixel value and a pixels per group value;
determining a pitch value for each of the multiple buffers;
determining an offset value for each of the multiple buffers;
assigning each of the multiple buffers to varying buffer locations within a frame buffer based on the position value, the byte per pixel value and the pixels per group value;
accessing a texture pipe using the at least one pixel; and
receiving at least one converted pixel from the texture pipe.

18. The method of claim 17 further comprising:
determining a plurality of pixel offset values for each of the multiple buffers wherein the pixel offset values are determined for each of the multiple buffers based on the sequence of the multiple buffers.

19. The method of claim 18 wherein the step of assigning each of the multiple buffers to varying buffer locations further comprises:
(a) multiplying the vertical value with the pitch value and the byte per pixel value;
(b) multiplying the horizontal value with the pixels per group value;
(c) adding the product of (b) with the pixel offset value;
(d) multiplying the sum of (c) with the byte per pixel value; and
(e) adding the product of (a) with the product of (d).

20. The method of claim 19 wherein steps (a) through (e) are repeated once for each of the multiple buffers.

21. The method of claim 17 further comprising:
writing a first converted pixel value to a first assigned buffer location; and
writing a second converted pixel value to a second assigned buffer location.

* * * * *